US011272604B2

(12) United States Patent
Burson

(10) Patent No.: US 11,272,604 B2
(45) Date of Patent: Mar. 8, 2022

(54) LIGHTNING GROUNDING APPARATUS

(71) Applicant: Delta Air Lines, Inc., Atlanta, GA (US)

(72) Inventor: David E. Burson, Locust Grove, GA (US)

(73) Assignee: Delta Air Lines, inc., Atlanta, GA (US)

(*) Notice: Subject to any disclaimer, the term of this patent is extended or adjusted under 35 U.S.C. 154(b) by 130 days.

(21) Appl. No.: 16/801,323

(22) Filed: Feb. 26, 2020

(65) Prior Publication Data

US 2021/0267040 A1 Aug. 26, 2021

(51) Int. Cl.
*H05F 3/02* (2006.01)
*F16C 11/04* (2006.01)

(52) U.S. Cl.
CPC ............... *H05F 3/02* (2013.01); *F16C 11/04* (2013.01)

(58) Field of Classification Search
CPC .................................. H05F 3/02; F16C 11/04
USPC ................................................. 361/216, 212
See application file for complete search history.

(56) References Cited

U.S. PATENT DOCUMENTS

| 5,226,204 | A | * | 7/1993 | Schoenberger | E01D 15/24 14/71.5 |
| 5,227,950 | A | * | 7/1993 | Twerdochlib | H01R 39/381 310/239 |
| 5,348,437 | A | * | 9/1994 | Krupke | B65G 69/003 414/401 |
| 7,570,474 | B1 | * | 8/2009 | Hettermann | H05F 3/02 361/212 |
| 2003/0145404 | A1 | * | 8/2003 | Hutton | B64F 1/3055 14/71.5 |
| 2013/0032373 | A1 | * | 2/2013 | Cutsforth | H01R 39/64 174/68.1 |
| 2014/0193189 | A1 | * | 7/2014 | Cutsforth | F16C 11/103 403/66 |

(Continued)

FOREIGN PATENT DOCUMENTS

JP 2006164665 A * 6/2006

OTHER PUBLICATIONS

Equivolt, "Lightning Protection Bonding Device," http://www.equivoltm.com/, Jan. 2017, 1 page.

(Continued)

*Primary Examiner* — Kevin J Comber
*Assistant Examiner* — Sreeya Sreevatsa
(74) *Attorney, Agent, or Firm* — Edell, Shapira & Finnan, LLC

(57) ABSTRACT

A lightning grounding apparatus that includes a pivot arm and an electrical grounding element at the distal end of the pivot arm. An actuator is mechanically coupled to the pivot arm and configured to rotate the pivot arm about an axis so as to swing the distal end of the pivot arm between a retracted position and an extended position that is configured to make physical contact between the electrical grounding element and a surface of a structure to be grounded. A limit switch is provided that is mounted on the pivot arm, and is responsive to a position of a limit switch operating arm. The limit switch operating arm is configured to trip the limit switch in response to a predetermined amount of force against the distal end of the pivot arm resulting from physical contact being made between the electrical grounding element and the surface of the structure.

20 Claims, 15 Drawing Sheets

(56) References Cited

U.S. PATENT DOCUMENTS

2020/0298679 A1* 9/2020 Vogt .................. B60J 7/0015

OTHER PUBLICATIONS

Dupin, et al. "Ground Handling and Flight Safety—Basics, Best Practices and Awareness-Raising," Technical Guide, https://www.ecologique-solidaire.gouv.fr/sites/default/files/2-DSAC_AssistanceEscale_Guide2015_EN_IoRES.pdf, Dec. 2015, 76 pages.
Fisher, et al., "Lightning Protection of Aircraft," NASA Reference Publication 1008, https://ntrs.nasa.gov/search.jsp?R=19780003081, Oct. 1977, 564 pages.
Fluke, "Reassessing Airport Tower Lightning Protection Systems," https://dam-assets.fluke.com/s3fs-public/6002146_6003_ENG_A_W.PDF, Jul. 2014, 4 pages.
Equivolt, "The Lightning Bond Device® LPBD," Screenshot retrieved from http://www.equivoltm.com/, on Feb. 25, 2020, 1 page.

* cited by examiner

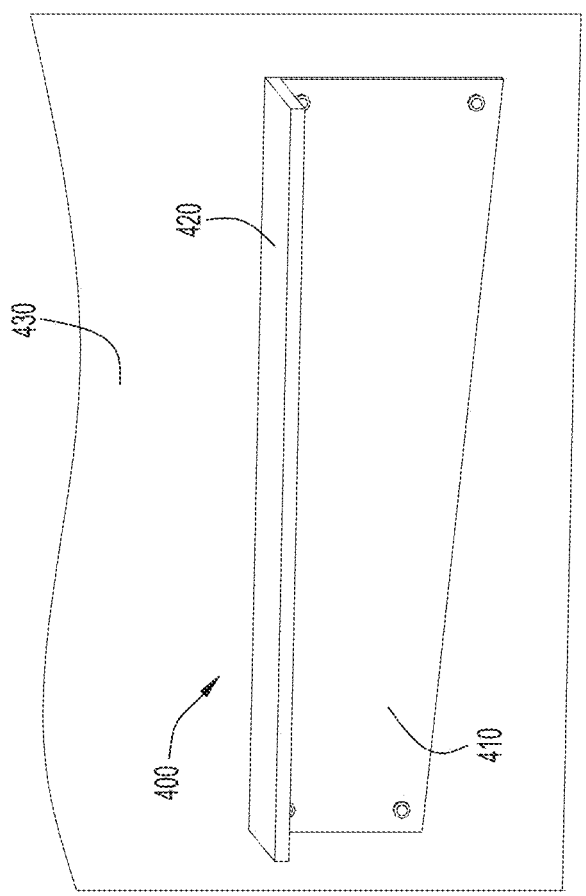

LIGHTNING GROUNDING APPARATUS

TECHNICAL FIELD

The present disclosure relates to electrical grounding of a large piece of equipment, such as an aircraft.

BACKGROUND

Equipment deployed outdoors can be exposed to lightning strikes. This is a particular concern for aircraft. For example, when an aircraft is parked at a passenger loading bridge, the aircraft should be electrically grounded. This reduces the risk of harm to passengers as they are boarding or de-planing the aircraft in the event that aircraft is struck by lightning. Moreover, the turn-around time for aircraft can be reduced if it can be assured that the aircraft is properly grounded, particularly during weather conditions with an increased risk of lightning strikes.

BRIEF DESCRIPTION OF THE DRAWINGS

FIG. 6 is a front view of a mounting bracket that is used to mount the lightning grounding apparatus to an exterior wall of an aircraft passenger loading bridge, according to an example embodiment.

DESCRIPTION OF EXAMPLE EMBODIMENTS

Overview

In one embodiment, a lightning grounding apparatus is provided. The apparatus includes a pivot arm having a proximal end and a distal end. An electrical grounding element may be attached at the distal end of the pivot arm. An actuator may be mechanically coupled to the pivot arm and configured to rotate the pivot arm about an axis so as to swing the distal end of the pivot arm between a retracted position and an extended position to make physical contact between the electrical grounding element and a surface of a structure to be grounded. A limit switch is provided that is mounted on the pivot arm. The limit switch is responsive to a position of a limit switch operating arm. The limit switch operating arm is configured to trip the limit switch in response to a predetermined amount of force against the distal end of the pivot arm resulting from physical contact being made between the electrical grounding element and the surface of the structure. One use case of the lightning grounding apparatus is to ground an aircraft when the aircraft is parked at a passenger loading bridge.

Example Embodiments

Presented herein is a system, an apparatus and an associated method to ensure that equipment, such as an aircraft, exposed to lightning strikes or other electrical surges, is properly electrically grounded. For example, a lightning grounding apparatus is provided that is designed to engage an external surface of an aircraft when the aircraft is parked at a passenger loading bridge or other similar passenger boarding structure. The lightning grounding apparatus facilitates physical contact between an electrical grounding element and an external surface of the equipment to be grounded, and to provide a visual and/or audible indication/notification that sufficient contact has been made to the equipment. This is particularly useful to an operator of an aircraft passenger loading bridge. Based on this indication/notification, airline gate personnel are assured that it is safe for passengers to board or de-plane the aircraft. Thus, the lightning grounding apparatus mitigates risks associated with lightning strikes, and in the case of airline operations, may help to reduce the turn-around time for aircraft.

Figure 1A:
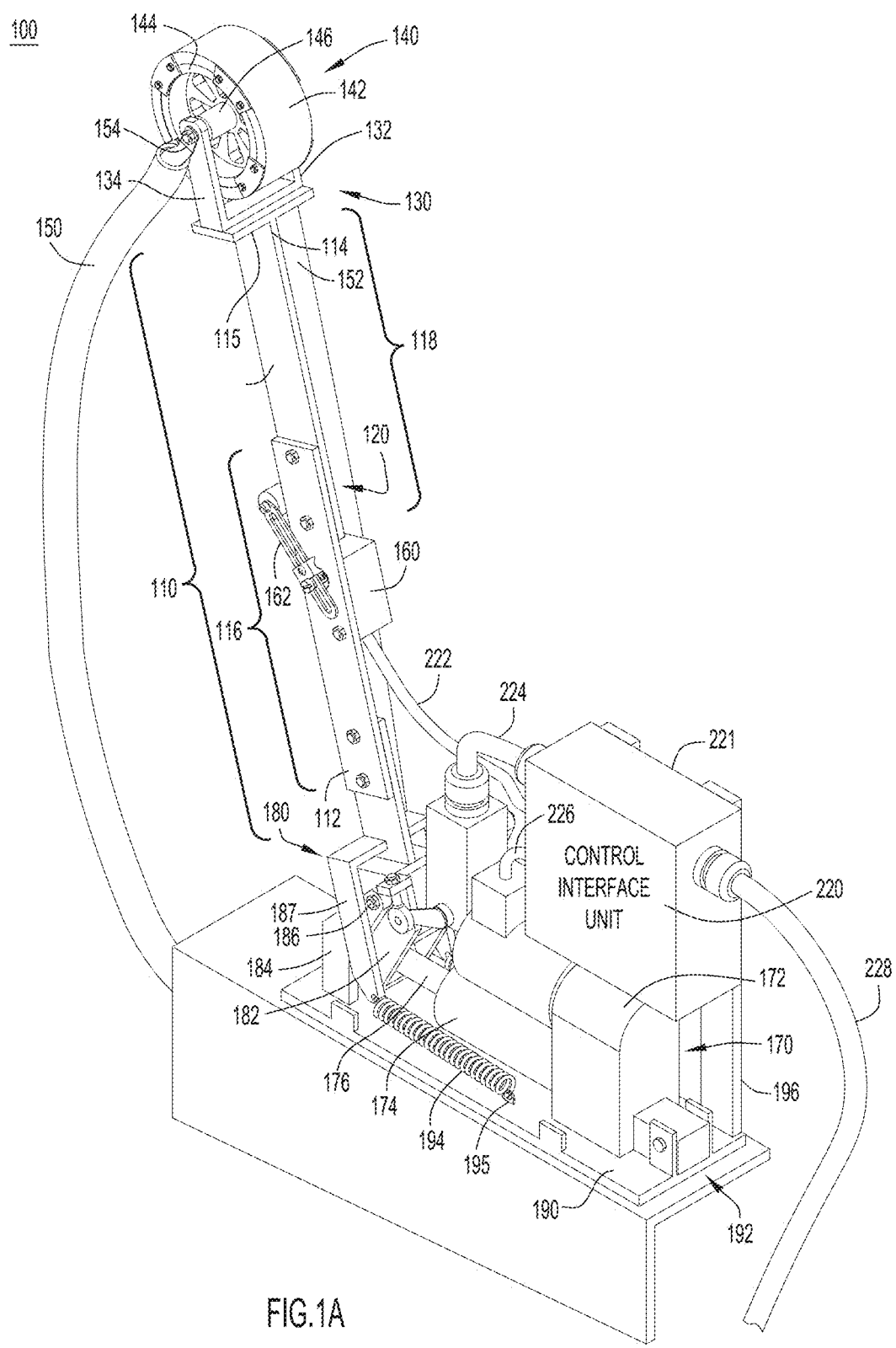
FIG. 1A is a perspective view of a lightning grounding apparatus, according to an example embodiment.
Figure 1B:
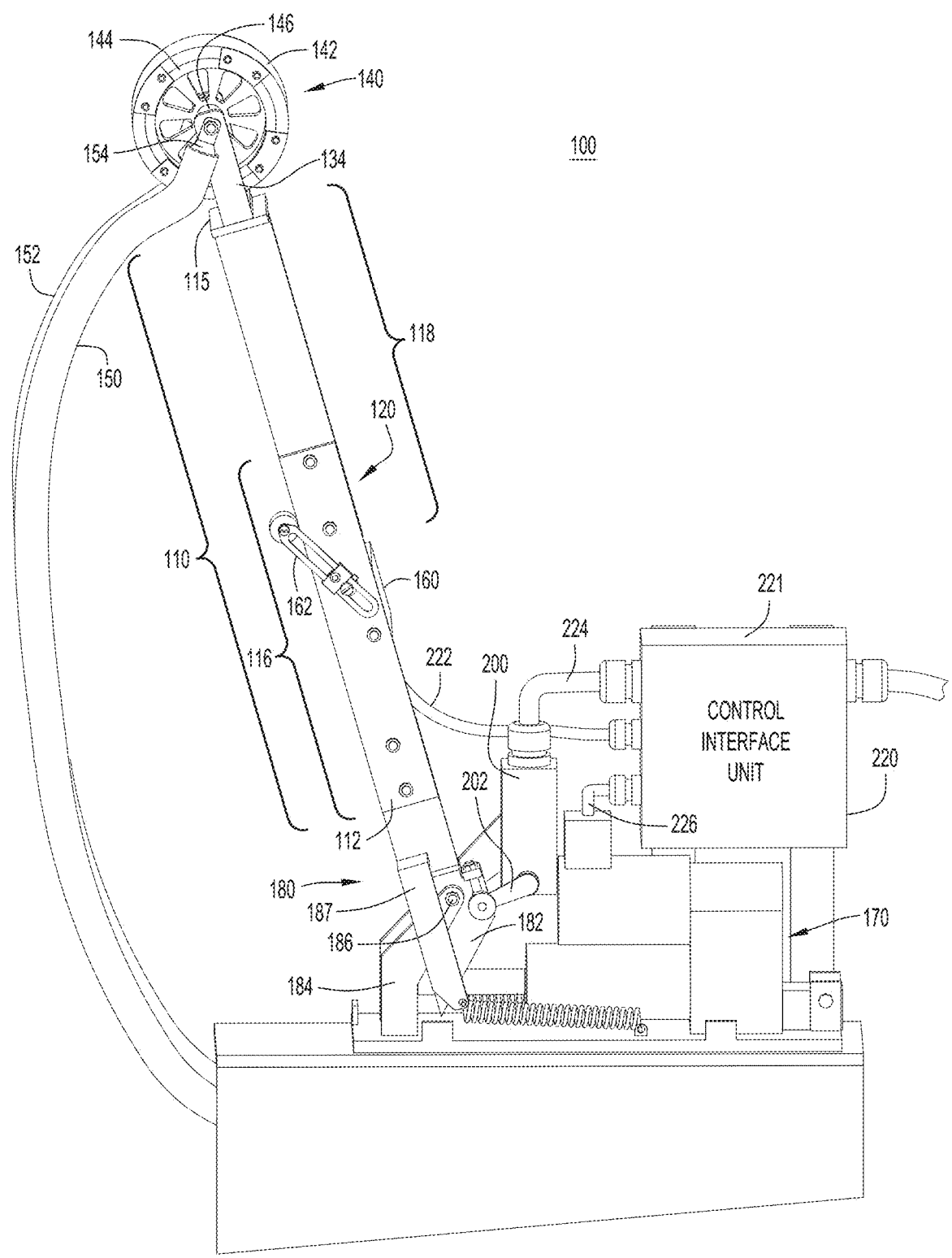
FIG. 1B is a side view of the lightning grounding apparatus, according to an example embodiment.

Referring first to FIGS. 1A and 1B, the lightning grounding apparatus is shown generally at 100. The lightning grounding apparatus 100 includes a pivot arm 110 having a proximal end 112 and a distal end 114. The distal end 114 may terminate in a cross-bar 115 that may be perpendicular to the pivot arm 110. The pivot arm 110 may be formed of stainless steel or other rigid metal or suitable other material.

The pivot arm 110 may include a first segment 116 and a second segment 118. The first segment 116 extends between the proximal end 112 and an intermediate point 120 of the pivot arm 110. The second segment 118 extends between the intermediate point 120 and the distal end 114. The first segment 116 and the second segment 118 are attached to each other at the intermediate point 120 in a hinge configuration such that the first and second segments 116 and 118 can pivot relative to each other about the intermediate point 120. The hinge configuration connection between the first segment 116 and second segment 118 of pivot arm 110 is described further below in connection with FIGS. 4A, 4B, 5A and 5B.

A bracket 130 is provided that attaches to the cross-bar 115 at the distal end 114 of the pivot arm 110. The bracket 130 may be U-shaped and is designed hold an electrical grounding element 140. The bracket 130 may include arms 132 and 134 that attach to opposite sides of the electrical grounding element 140.

The electrical grounding element 140 may take any of a variety of forms. In one form, the grounding element takes the shape of a wheel that rotates about an axle that is mounted between the arms 132 and 134 of the bracket 130. For example, the electrical grounding element 140 may include a conductive canvas material 142 that is wrapped around a wheel 144. The wheel 144 attaches to a bushing 146 that is mounted between the arms 132 and 134 of the bracket 130.

The electrical grounding element 140 may take the form of any suitable electrically conductive element, such as wire mesh material attached to a support structure.

The lightning grounding apparatus 100 further includes insulated grounding straps 150 and 152. In one form, first ends of the grounding straps 150 and 152 are electrically attached (e.g., soldered and/or screwed) to the arms 132 and 134 of the bracket 130, as shown at 154 in FIGS. 1 and 2. However, the grounding straps 150 and 152 may be connected by other mechanisms to the electrical grounding element 140. Second ends of the grounding straps 150 and 152 may be secured and electrically connected to a mounting bracket that is attached to, or a part of, a passenger loading bridge, for example, as described below in connection with FIGS. 7 and 8.

The grounding straps 150 may be heavy gauge electrical conductors contained in an isolated protective sleeve. The electrical conductors in the grounding straps 150 and 152 are sufficient to safely conduct the relatively large amount of electrical energy associated with a lightning strike.

The lightning grounding apparatus 100 includes a limit switch 160 that may be mounted to a side of the first segment 116 of the pivot arm, as best shown in FIG. 1A. A limit switch operating arm 162 is coupled to the limit switch 160 and is configured to trip the limit switch 160 in response to a predetermined amount of force against the distal end 114 of the pivot arm 110 resulting from physical contact being made between the electrical grounding element 140 and a structure that is to be electrically grounded, such as the exterior surface of an aircraft. The limit switch 160 and limit switch operating arm 162 are described in more detail below in connection with FIGS. 4A, 4B, 5A and 5B. The limit switch 160 is also referred to herein as a pivot arm limit switch 160.

The lightning grounding apparatus 100 further includes an actuator assembly 170 that is mechanically coupled to the proximal end 112 of the pivot arm 110. The actuator assembly 170 may be a linear actuator that includes an actuator motor 172 and an actuator arm unit 174. The actuator arm unit 174 includes an actuator rod 176 that is configured to extend and retract by the actuator arm unit 174.

The mechanical coupling of the actuator assembly 170 to the pivot arm 110 may be take a variety of forms. In one example, the proximal end 112 of the pivot arm 110 may be attached to a bracket 180. The bracket 180 is in turn attached to an actuator pivot 182 that is held in place and allowed to rotate with respect to support arms 184 about a pin 186 that extends through the support arms 184 and the actuator pivot 182. The bracket 180 has bracket arms 187 that extend on opposite sides of the support arms 184. The end of the actuator rod 176 is attached to the actuator pivot 182. Further details of the mechanical coupling between the actuator assembly 170 and the pivot arm 110 are described below in connection with FIGS. 2A and 2B.

The actuator assembly 170 may be attached to a support frame 190. In one example, the support arms 184 are formed integrally as part of the support frame 190. A pin-retention mount 192 is provided to support one end of the actuator assembly 170. Springs 194 are attached at one end to a protruding ring 195 of the support frame 190 and at the other end to bottom ends of the bracket arms 187. The springs 194 serve to bias the bracket 180, and hence the pivot arm 110, to an extended position, but the force of the springs 194 may be overcome by the actuator assembly 170. The force of the springs 194 are overcome by the actuator assembly 170 when the pivot arm 110 is retracted. When the pivot arm 110 is extended, the bracket arm 187 moves with the actuator pivot 182 until the bracket arm 187 is stopped by contact with the surface of the entity to be grounded, e.g., aircraft fuselage. The bracket arm 187 is held in place by the tension provided by spring 194.

The support frame 190 may be configured to be attached to a passenger loading bridge, as described below in connection with FIGS. 6-8. The support frame 190 further includes a vertical post 196 to support an enclosure for a control interface unit, described below.

A limit switch 200 may be provided that is coupled to a limit switch operating arm 202 that is attached at one end to the actuator pivot 182. The limit switch 200 and limit switch operating arm 202 are provided to monitor movement of the bracket 180 supporting the pivot arm 110 and thus, indirectly, monitor movement of the actuator rod 176 of the actuator assembly 170. Thus, stop positions on the limit switch 200 are set/calibrated with respect to movement ranges of the limit switch operating arm 202. The stop positions are used to control how the actuator assembly 170 moves the actuator rod 176 so as to rotate or swing the pivot arm 110 between a retracted position and an extended position, as described further below. The limit switch 200 is also referred to herein as an actuator limit switch.

Figure 2A:
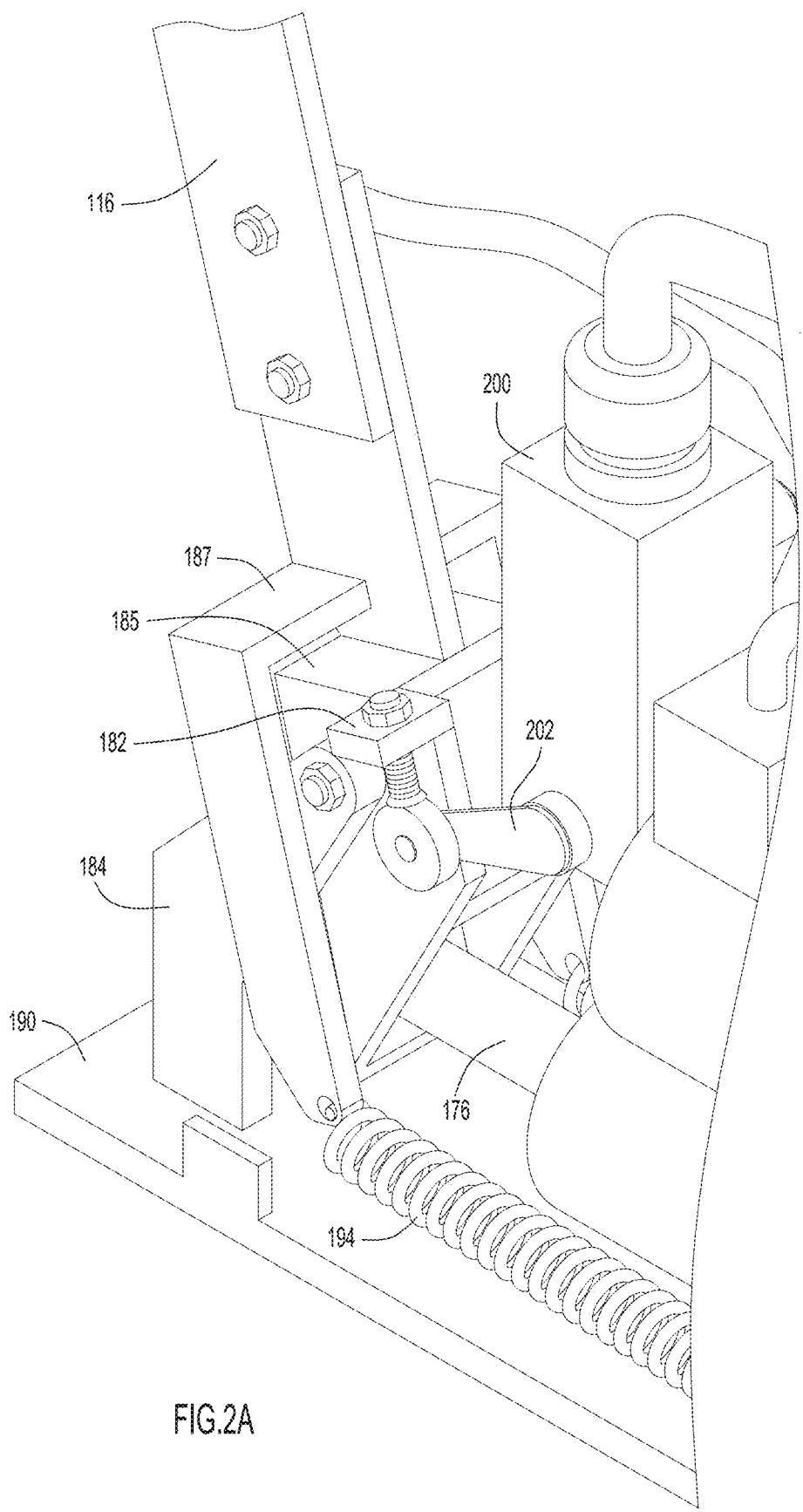
FIG. 2A is an close up side view of an arrangement for connecting a pivot arm to an actuator of the lightning grounding apparatus, according to an example embodiment.
Figure 2B:
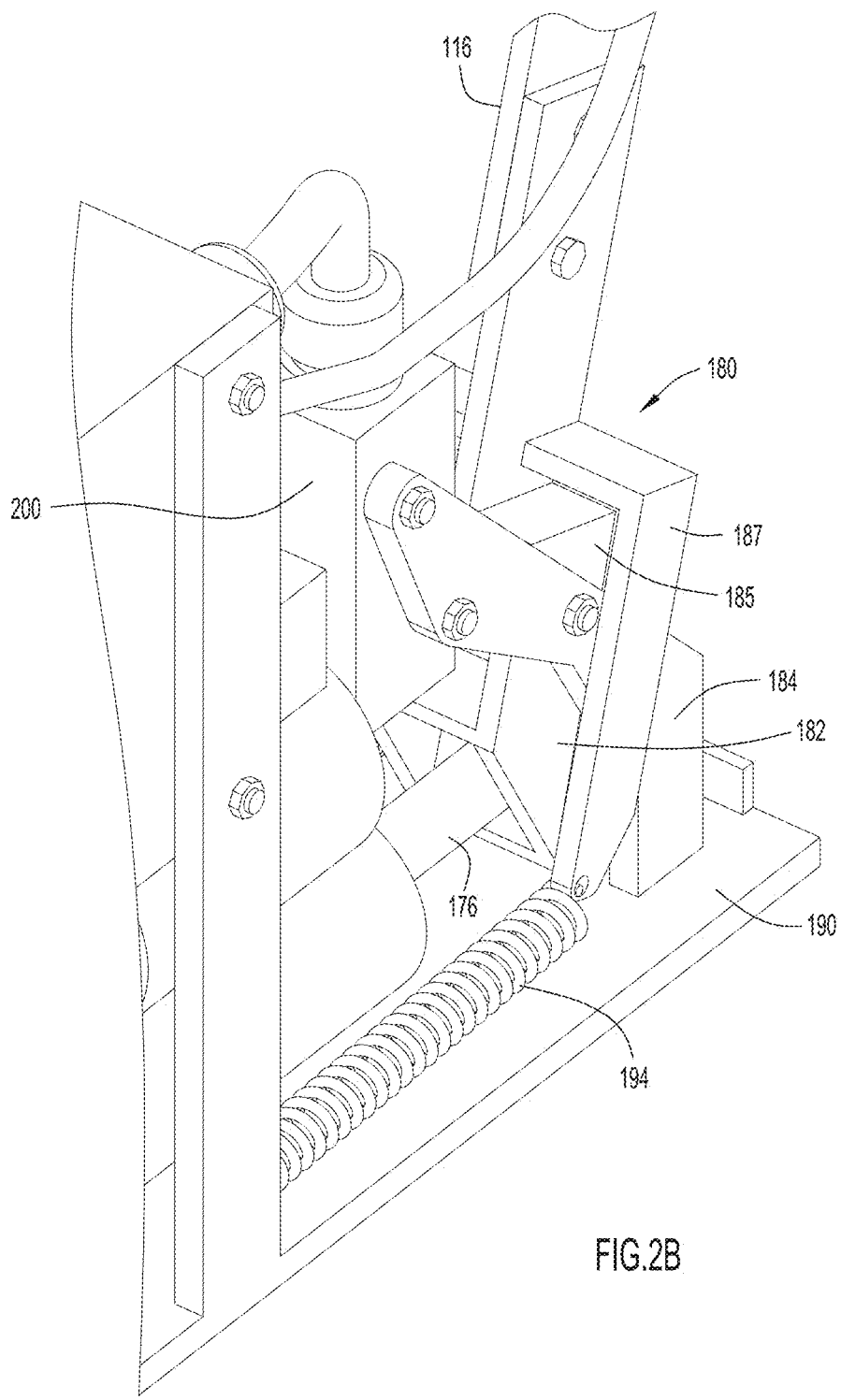
FIG. 2B is a close up end view of the arrangement for connecting a pivot arm to an actuator of the lightning grounding apparatus, according to an example embodiment.

Turning to FIGS. 2A and 2B, the arrangement by which the actuator assembly 170 is mechanically coupled to the bracket 180 is described in more detail. As mentioned above, the actuator assembly 170 may be a linear actuator, and the linear actuator is attached to the support frame 190. The support arms 184 may be formed integrally with the support frame 190 and extend above the support frame 190. The support arms 184 are spaced apart from each other to accommodate other structures.

To this end, the bracket 180 is configured to be attached (bolted) to the proximal end of the pivot arm 110, and in particular, to a proximal end of the first segment 116 of the pivot arm 110. The bracket 180 further includes a pivot connector 185 that is attached to the actuator pivot 182 and is mounted between the support arms 184 to rotate about the pin 186 passing through the support arms 184. As described above and shown in FIGS. 2A and 2B, the actuator pivot 182 is attached to the pivot connector 185 and to the actuator rod 176 of the actuator assembly 170. The actuator pivot 182 is configured to translate linear movement of the actuator rod 176 between the first actuator position and the second actuator position to rotational movement of the pivot arm 110 between the aforementioned retracted position and extended position.

Figure 3:
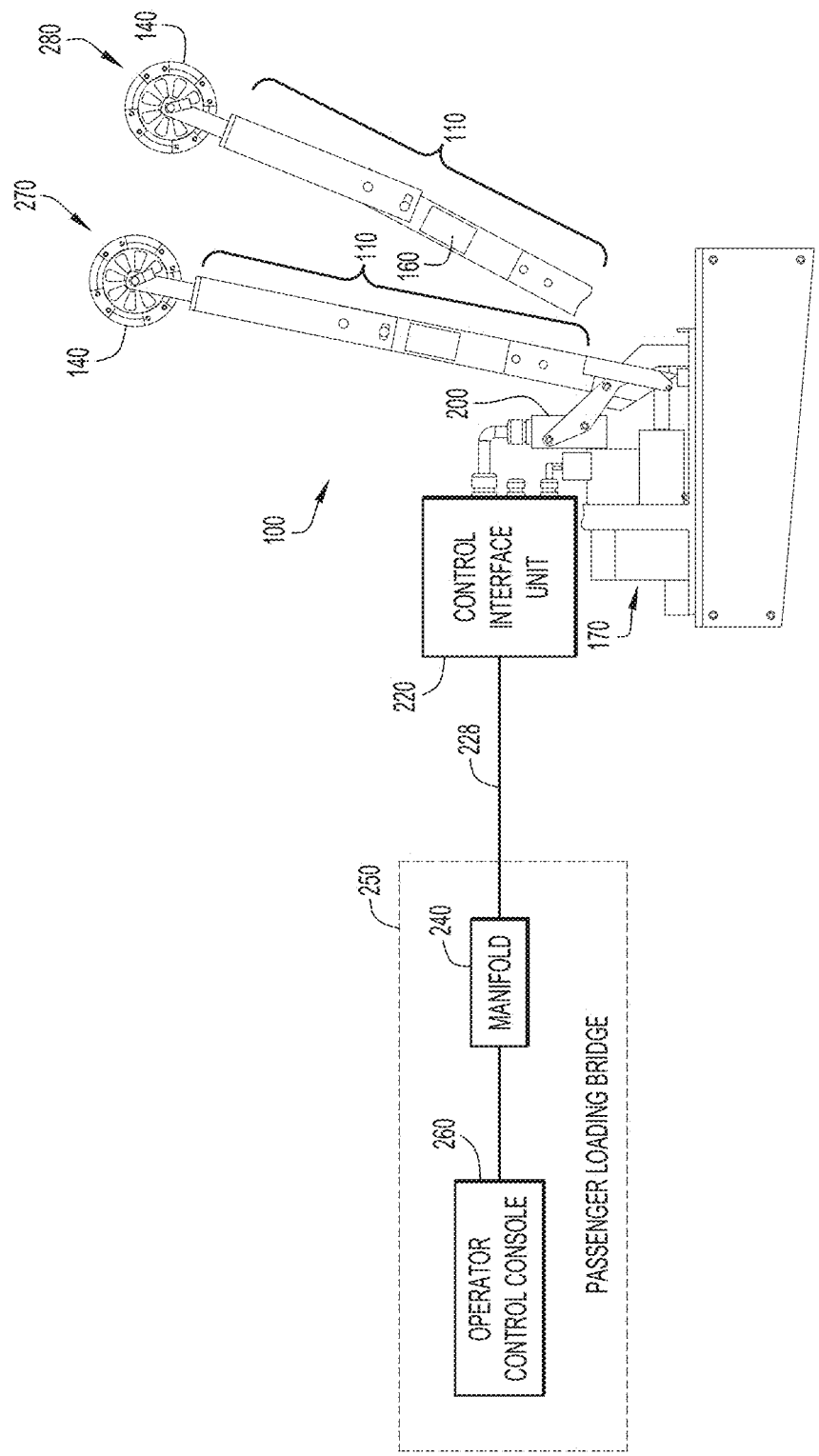
FIG. 3 is a block diagram showing the lightning grounding apparatus interfacing with an operator console in a passenger loading bridge, according to an example embodiment.

Reference is now made to FIG. 3, with continued reference to FIGS. 1A and 1B. The lightning grounding apparatus 100 includes a control interface unit 220 that is contained in an enclosure 221. The control interface unit 220 includes connections and electrical components used to control the lightning grounding apparatus 100. For example, as shown in FIGS. 1A and 1B, cable 222 connects the pivot arm limit switch 160 to the control interface unit 220 and cable 224 connects the actuator limit switch 200 to the control interface unit 220. Cable 226 connects between the actuator assembly 170 and the control interface unit 220.

As shown in FIG. 3, the control interface unit 220 connects, via cable 228, to a manifold 240 on a passenger loading bridge 250, which is in turn connected to an operator control console 260 of the passenger loading bridge 250.

The actuator assembly 170 may be configured to rotate or swing the pivot arm 110 between a retracted position 270 and an extended position 280, as shown in FIG. 3. The extended position 280 is for the purpose of making physical contact between the electrical grounding element 140 and a surface of a structure to be electrically grounded, such as an exterior surface of an aircraft. In one form, the actuator assembly 170 is configured to retract actuator rod 176 in order to swing the pivot arm 110 to the extended position shown at 280, and to extend actuator rod 176 in order to move the pivot arm 110 to the retracted position 270. It should be understood that numerous other actuator configurations and actuator types may be used to achieve similar movements of the pivot arm 110.

Figure 4A:
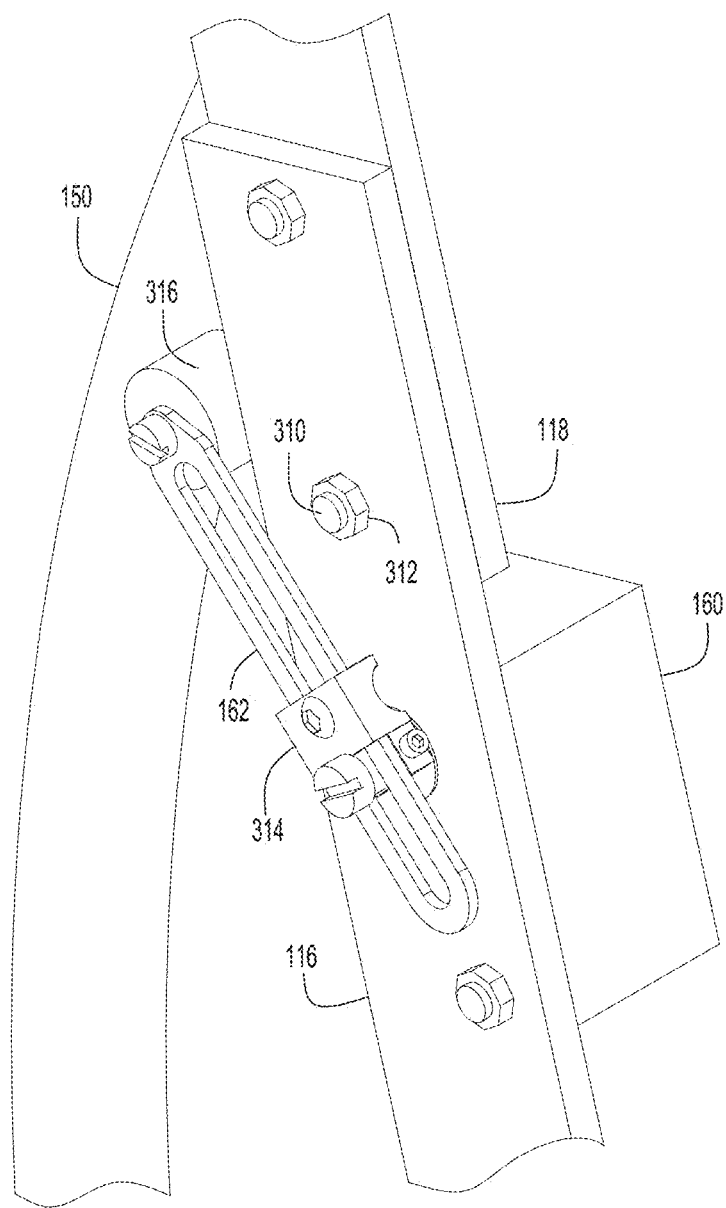
FIG. 4A is a close-up side view of a portion of a pivot arm of the lightning grounding apparatus and showing an arrangement of a pivot arm limit switch and limit switch operating arm, according to an example embodiment.
Figure 4B:
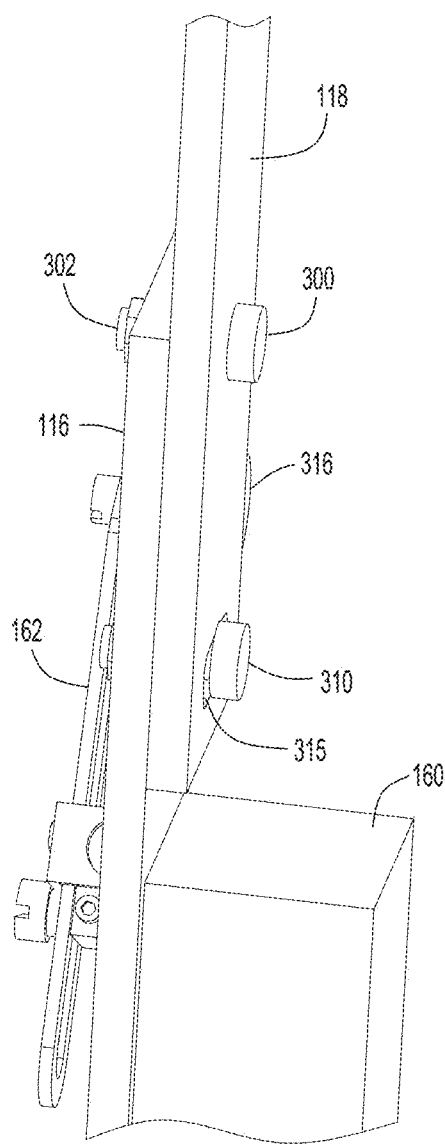
FIG. 4B is a close-up rear view of the portion of the pivot arm shown in FIG. 4A showing an arrangement of the pivot arm limit switch and limit switch operating arm, according to an example embodiment.

Reference is now made to FIGS. 4A and 4B, which show the pivot arm limit switch 160 and limit switch operating arm 162 in more detail. As described above, the first segment 116 and the second segment 118 of the pivot arm 110 are attached to each other in a hinge configuration. To this end, the first and second segments 116 and 118 have holes to accept bolts 300 and 310. The bolt 300 is secured by a nut 302 in such a manner to allow relative rotational movement between the first and second segments 116 and 118. The bolt 310 is secure by nut 312. A hole 315 in the second segment 118 extends a distance across a width of the second segment 118 to permit the bolt 310 to move within the second segment 118. This permits the second segment 118 to pivot or rotate relative to the first segment 116 about a pivot point established by bolt 300.

The limit switch 160 may be mounted to the first segment 116 beneath the bolt 310 where the second segment 118 terminates. The limit switch 160 includes an axle (not visible in the figures) that passes through a hole in the first segment 116. The axle rotates within the hole in the first segment 116. The limit switch operating arm 162 includes an attachment assembly 314 at one end that attaches the limit switch operating arm 162 to the axle of the limit switch 160. The position of attachment assembly 314 may be adjustable along the length of the limit switch operating arm 162. The other end of the limit switch operating arm 162 may include a roller 316 or other type engaging member that is positioned to abut an edge of the second segment 118. Consequently, when the second segment 118 pivots relative to the first segment 116 about the bolt 300, the limit switch operating arm 162 is caused to move, which in turn, rotates the axle (counter-clockwise as viewed in FIG. 4A) of the limit switch 160. The limit switch 160 and limit switch operating arm 162 are set so that the limit switch 160 is tripped by a predetermined amount of rotation of the axle, caused by an associated predetermined pivot amount of the second segment 118 relative to the first segment 116.

Figure 5A:
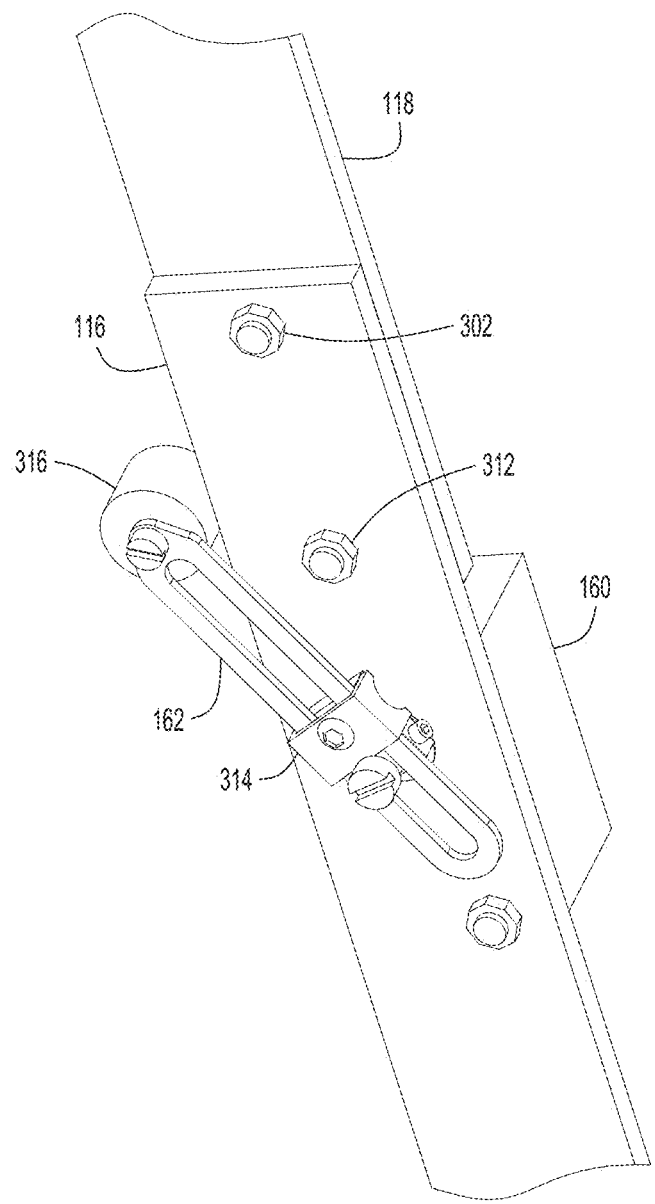
FIG. 5A is a side view showing the pivot arm of the lightning grounding apparatus in a position in which the pivot arm limit switch is not tripped, according to an example embodiment.
Figure 5B:
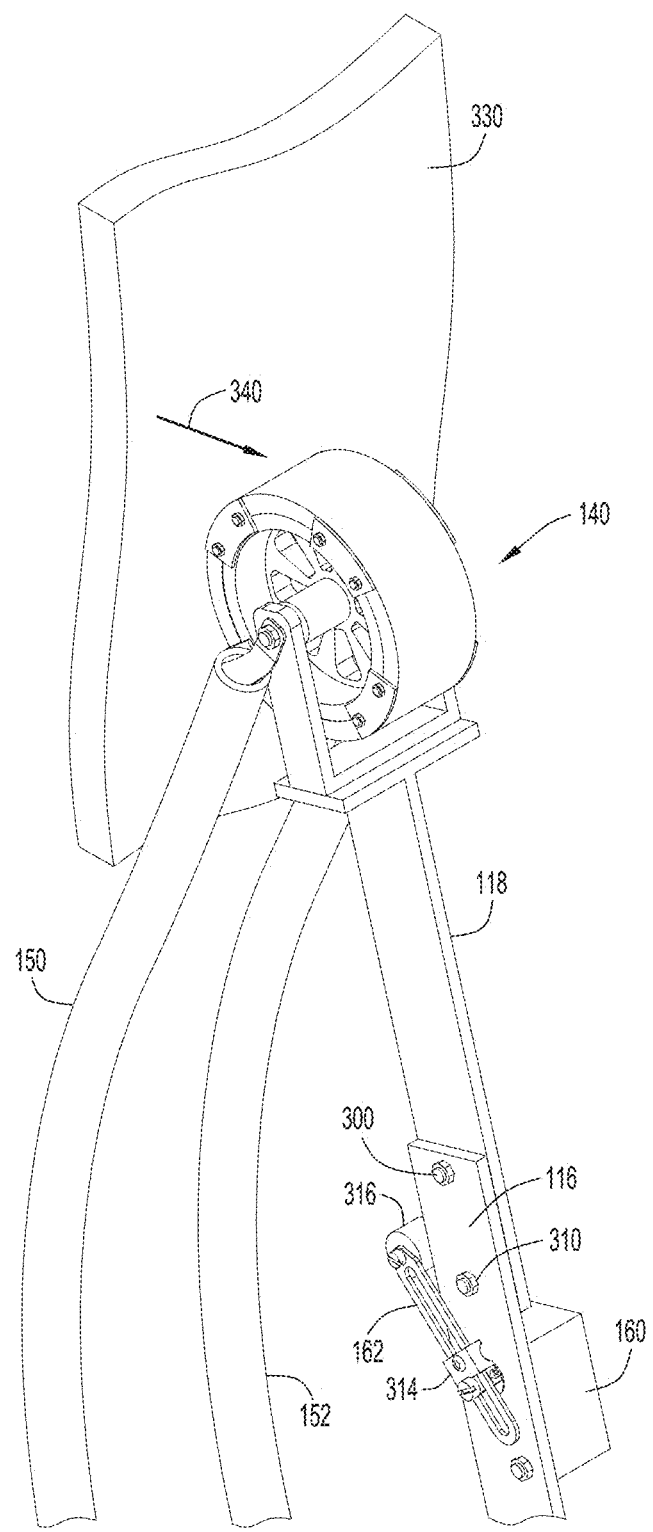
FIG. 5B is a side view of the pivot arm of the lightning grounding apparatus in a position in which an electrical grounding element on the pivot arm is in sufficient physical contact with a surface so as to trip the pivot arm limit switch, according to an example embodiment.

Reference is now made to FIGS. 5A and 5B. FIG. 5A shows the first segment 116 and second segment 118 in a position in which the limit switch 160 is not tripped because the second segment 118 is substantially aligned with the first segment 116. There is no relative movement of the first segment 116 and second segment 118 about the bolt 300. This would be the case when the pivot arm 110 is in the retracted position 270 shown in FIG. 3.

FIG. 5B, on the other hand, shows that the electrical grounding element 140 is in physical contact with a surface 330. When the electrical grounding element 140 is pushed against the surface 330 with sufficient counteracting force 340, there is movement of the first segment 116 of the pivot arm 110 relative to the second segment 118 of the pivot arm 110 about bolt 300. This may occur when the actuator assembly 170 is operated to rotate the pivot arm 110 by a distance such that the electrical grounding element 140, attached to the second segment 118 of the pivot arm 110, makes physical contact with a surface 330. The limit switch operating arm 162 is held in place by internal spring tension provided within the limit switch 160. This spring tension is sufficient to hold the roller 316 on the end of the limit switch operating arm 162 in contact with second segment 118. As described above in connection with FIG. 3, this would occur when the pivot arm is in the extended position 280. Thus, a state of the limit switch 160 is indicative of whether the electrical grounding element 140 is in sufficient physical contact with the surface 330. When the limit switch 160 is tripped by the limit switch operating arm 162 moving a sufficient amount, the state of the limit switch 160 indicates sufficient physical contact with the surface 330 has occurred. Otherwise, the state of the limit switch 160 indicates that sufficient contact with the surface 330 has not occurred.

When an edge of the second segment 118 engages the roller 316 of the limit switch operating arm 162, the limit switch operating arm 162 rotates in a counter-clockwise direction, causing the axle of the limit switch 160 to rotate counter-clockwise. When the axle of the limit switch 160 rotates a sufficient predetermined amount, the limit switch 160 is tripped. As explained above, the predetermined amount of rotation of the axle of the limit switch 160 that trips the limit switch 160 is calibrated to be based on a sufficient amount of relative movement between the first segment 116 and second segment 118 caused by the electrical grounding element being in sufficient physical contact with the surface 330 such that the counteracting force 340 causes the predetermined amount of rotation of the axle of the limit switch 160.

As an example, the force on the pivot arm 110 in the retracted position may be approximately 8 pounds, when it is not in contact with a surface to be grounded. On the other hand, the force on the pivot arm 110 may be as much as 10 pounds when in sufficient contact with the surface to be grounded. Thus, in one non-limiting example, 10 pounds of force against the pivot arm 110 is sufficient to trip the limit switch 160 so as to indicate that the electrical grounding element 140 is in sufficient contact with a surface, e.g., an aircraft, to ground the surface, without causing damage to the surface.

Figure 7:
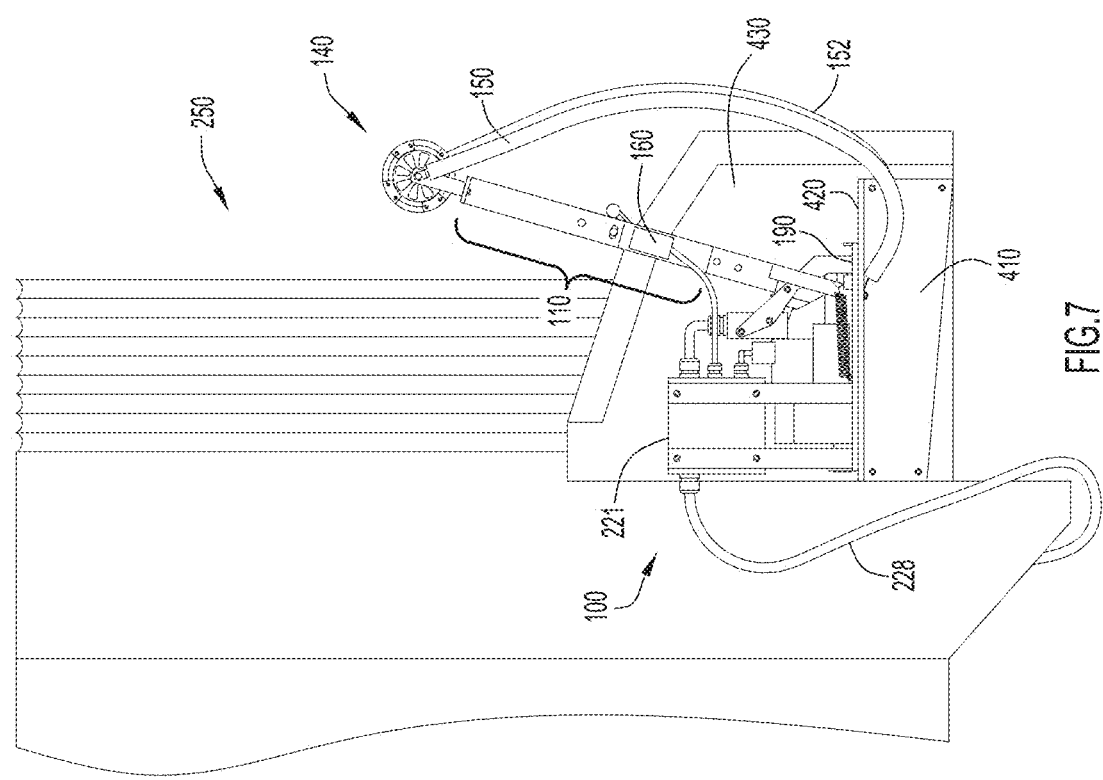
FIG. 7 is a side view showing the lightning grounding apparatus secured to the mounting bracket that is secured to the exterior wall of the aircraft passenger loading bridge, according to an example embodiment.
Figure 8:
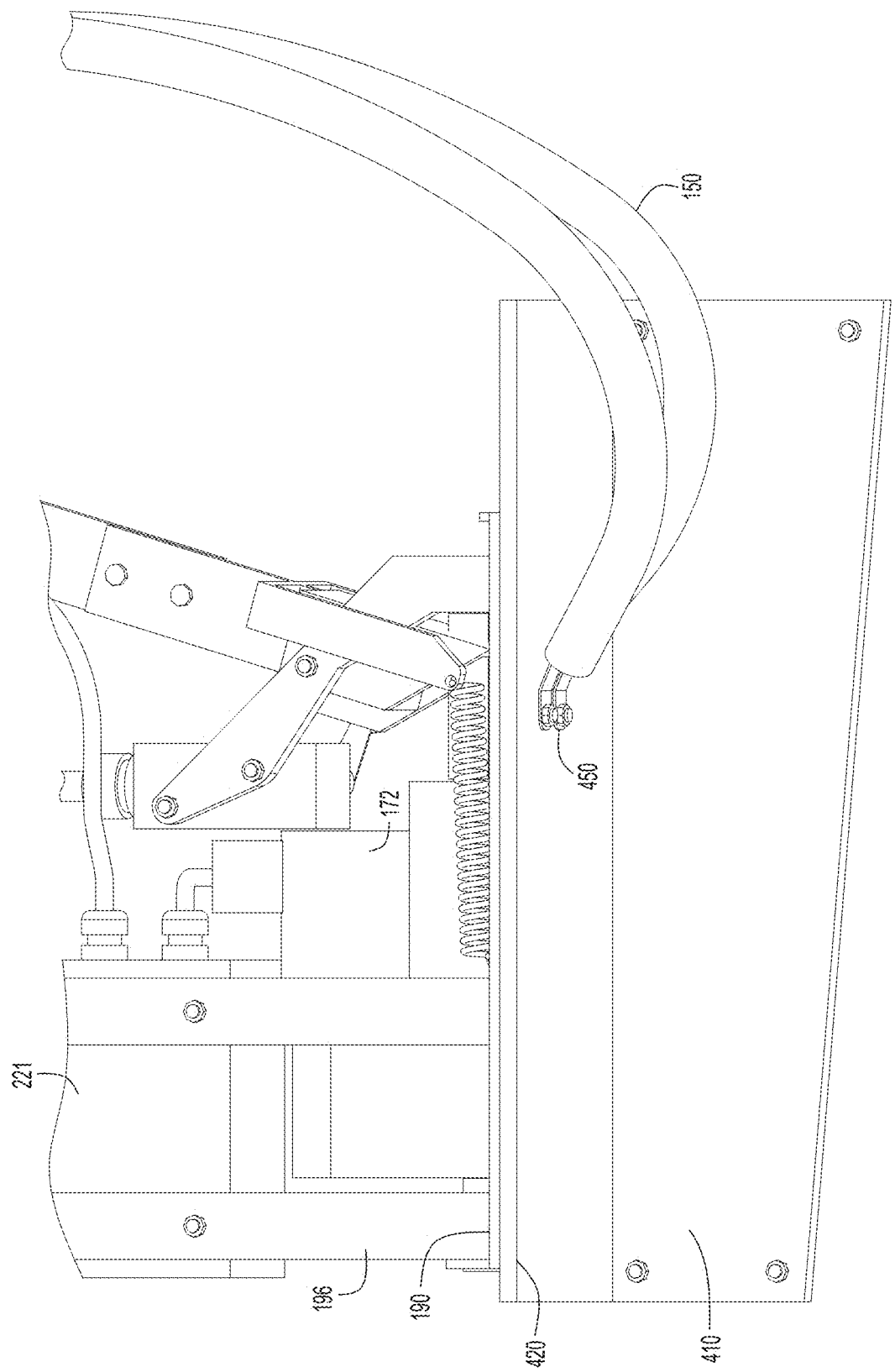
FIG. 8 is a close-up side view showing the lightning grounding apparatus secured to the mounting bracket that is secured to the exterior wall of the aircraft passenger loading bridge, according to an example embodiment.

Reference is now made to FIGS. 6-8. These figures show how the lightning grounding apparatus 100 is mounted to a passenger loading bridge. FIG. 6 shows a close-up view of a mounting bracket 400 that is configured to be attached to an side exterior wall of a passenger loading bridge 250. The mounting bracket 400 includes a vertical mounting face 410 and a horizontal support surface 420. The vertical mounting face 410 is configured to be attached to an exterior side wall 430 of a passenger loading bridge. The horizontal support surface 420 is sized to support the support frame 190 of the lightning grounding apparatus 100.

To this end, reference is now made to FIGS. 7 and 8. The lightning grounding apparatus 100 is secured to the mounting bracket 400 on the exterior side wall 430 of the passenger loading bridge 250. The grounding straps 150 and 152 are attached to an underside of the horizontal support surface 420 of the mounting bracket 400, as best shown at 450 in FIG. 8.

Figure 9:
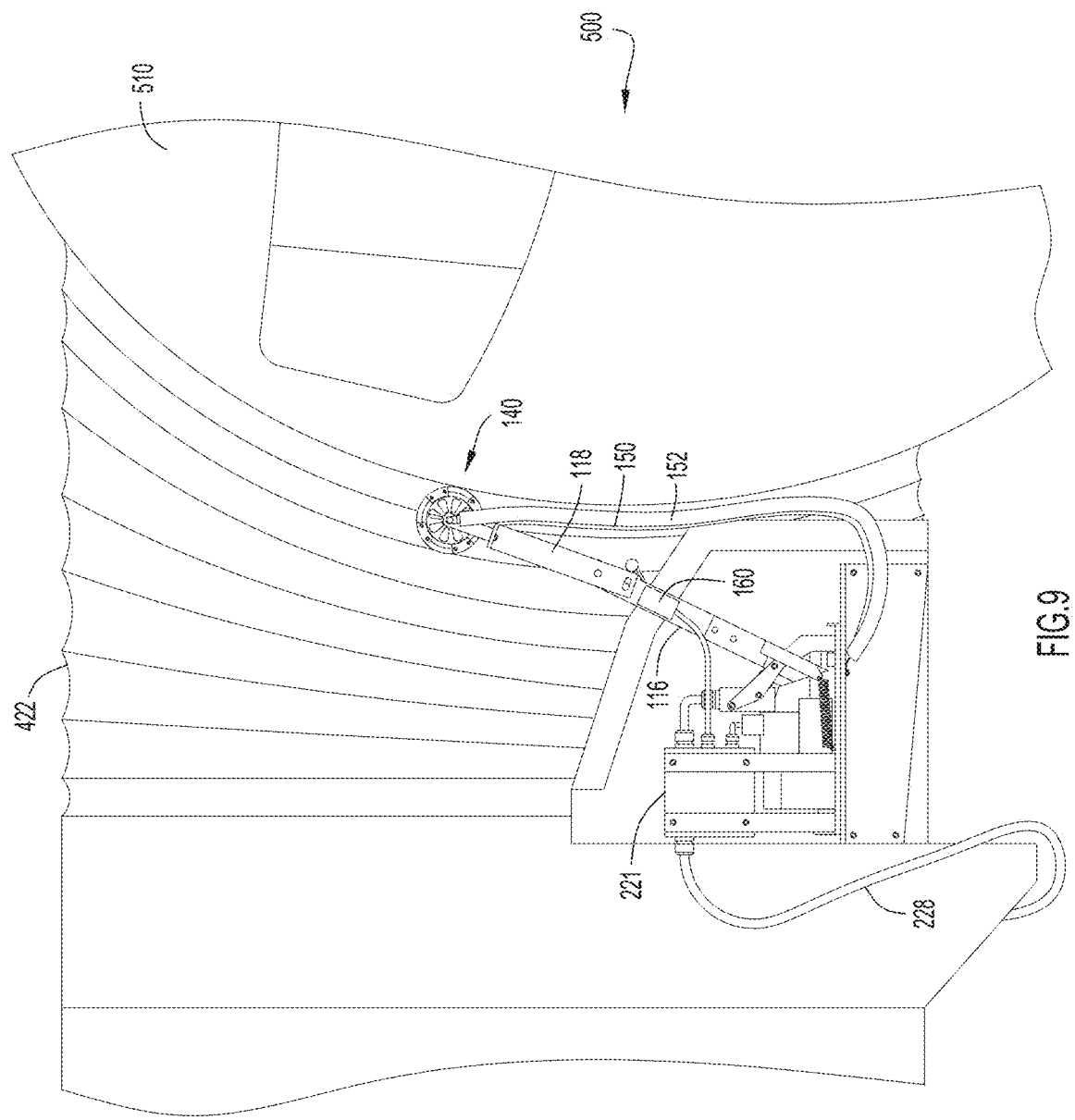
FIG. 9 is a view similar to that of FIG. 7, and showing the lightning grounding apparatus making physical contact with an external surface of an aircraft while the passenger loading bridge is docked to a boarding door of the aircraft, according to an example embodiment.

Turning now to FIG. 9, a diagram is shown in which the passenger loading bridge 250 is maneuvered to the boarding door of an aircraft 500. The boarding door of the aircraft 500 is not visible in FIG. 9 because it is enclosed by an expandable curtain 442 of the passenger loading bridge 250. When the passenger loading bridge 250 is in position at the boarding door of the aircraft 500, the actuator assembly 170 is controlled to swing the pivot arm 110 to the extended position so that the electrical grounding element 140 on the end of the pivot arm 110 makes physical contact with an exterior surface 510 of an aircraft 500. The exterior surface 510 of the aircraft 500 is, for example, the aircraft fuselage. As explained above in connection with FIG. 5B, when the electrical grounding element 140 makes sufficient physical contact with the exterior surface 510 of the aircraft 500, the second segment 118 of the pivot arm 110 rotates relative to the first segment 116 by an amount that trips the limit switch 160.

Figure 10:
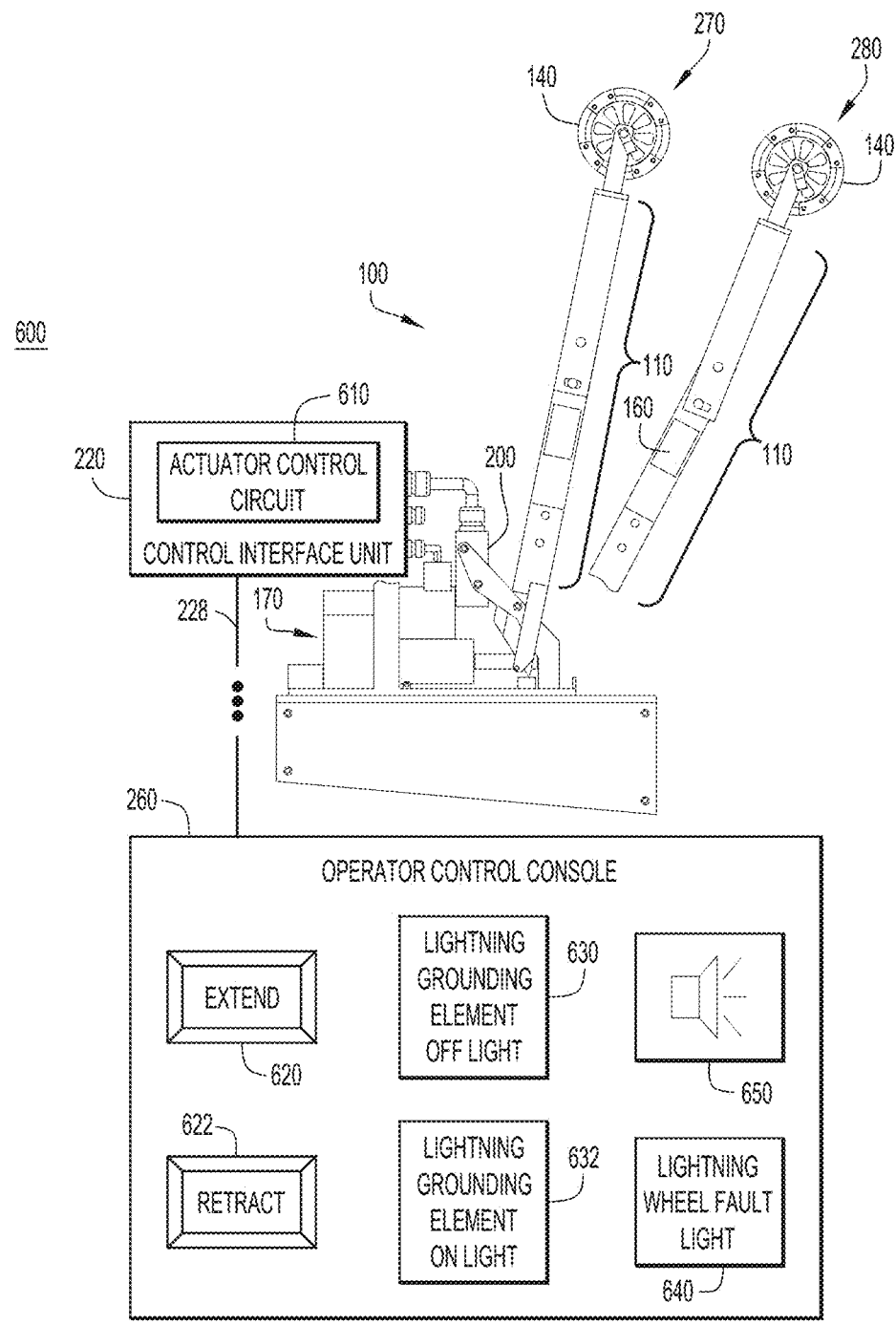
FIG. 10 is a block diagram of a system for grounding an aircraft, the system including the lightning grounding apparatus and an operator control console of the passenger loading bridge, according to an example embodiment.

FIG. 10 shows a block diagram of a system 600 for grounding an aircraft. The system 600 includes the lightning grounding apparatus 100 and the operator control console 260 in a passenger loading bridge. The control interface unit 220 may reside proximate to and integral with the lightning grounding apparatus 100, whereas the operator control console 260 may be inside an operator cabin/cockpit of the passenger loading bridge.

The control interface unit 220 may include an actuator control circuit 610 that controls the actuator motor 172. Alternatively, the actuator control circuit 610 may be part of control circuitry that resides on the passenger loading bridge. The actuator control circuit 610 may include one or more capacitors and/or other circuit elements useful to control the actuator motor 172, and may connected to the actuator limit switch 200 (shown in FIGS. 1A, 1B, 2A and 2B). The control interface unit 220 also includes connectors to connect signals between the operator control console 260 and various components of the lightning grounding apparatus 100, such as the pivot arm limit switch 160, the actuator assembly 170 and the actuator limit switch 200.

The operator control console 260 may include one or more control buttons to control the lightning grounding apparatus 100 as well as one or more status indicator lights that indicate an operational state of the lightning ground apparatus 100. For example, the operator control console 260 includes an extend button or switch 620 used to initiate extending of the pivot arm of the lightning grounding apparatus 100 and a retract button or switch 622 used to initiate retracting of the pivot arm of the lightning grounding apparatus 100. The functions of the buttons or switches 620 and 622 could be integrated into one control or switch button. In addition, the operator control console 260 may include one or more visual indicators of the state of the lightning grounding apparatus 100. A "lightning grounding element off" indicator light 630 may be provided to illuminate when the electrical grounding element 140 of the lightning grounding apparatus 100 is not in sufficient physical contact with the aircraft to trip the pivot arm limit switch 160. A "lightning grounding element on" indicator light 632 may be provided to illuminate when the electrical grounding element 140 of the lightning grounding apparatus 100 is in sufficient physical contact with the aircraft to trip the pivot arm limit switch 160. It should be understood that the functions of the indicator lights 630 and 632 may be combined into one single color or multi-color indicator light.

Furthermore, the extend and retract controls for the lightning grounding apparatus 100 may be integrated with the controls of the passenger loading bridge. In this way, when the passenger loading bridge is rolled out and extended to dock with an aircraft, the extend function of the lightning grounding apparatus 100 is automatically initiated to swing the pivot arm 110 out to engage the surface of the aircraft. A separate button or switch need not be selected by the operator to extend the lightning grounding apparatus 100. Similarly, when the passenger loading bridge is pulled back away from the aircraft, the retract function of the lightning ground apparatus 100 is automatically initiated to return the pivot arm 110 to its retracted position. In one example, the extended and retracted positions of the lightning grounding apparatus 100 may automatically track/follow the functions of an auto-leveler on the passenger loading bridge. That is, the lightning grounding apparatus 100 is automatically extended when the auto-leveler is engaged, and the lightning grounding apparatus 100 is automatically retracted when the auto-leveler is dis-engaged.

There may also be a fault indicator light 640 that illuminates when a fault is detected by the system 600, such as when the limit switch operating arm 162 does not trip the limit switch 160. The fault will occur anytime the pivot arm 110 is extended and limit switch 160 is not tripped by the movement of the second segment 118, contacting limit switch operating arm 162.

Further still, the operator control console 260 may include a loudspeaker or horn 650 to present an audible alert when there is a fault detected in the lightning grounding apparatus 100, or when grounding contact is lost with the aircraft.

Operation of the system 600 is now described with continuing reference to FIG. 10, as well as with reference to FIGS. 7 and 9. In operation, an airline personnel or other operator uses the operator control console 260 to interact with the lightning grounding apparatus 100. The operator takes his/her position in the operator cabin/cockpit of the passenger loading bridge where the operator control console 260 may be located. Once the aircraft arrives to the gate, the operator can maneuver the passenger loading bridge to the aircraft boarding door, as shown in FIG. 9. Next, the operator selects the extend switch 620. This causes the actuator control circuit 610 to activate the actuator motor 172 to move the pivot arm 110 of the lightning grounding apparatus 100 to the extended position. The extended and retracted functions of the actuator assembly 170 are controlled by limit switch 200. Once the pivot arm 110 comes in contact with the surface of the equipment to be grounded (e.g., aircraft fuselage), the springs 194 maintain the contact of the electrical grounding element 140. The limit switches 200 and 160 may work independent of each other.

In the extended position, the electrical grounding element 140 engages the exterior surface 510 of the aircraft 500. Until the limit switch 160 is tripped, the "lightning grounding element off" indicator light 630 is kept illuminated to indicate to the operator that the electrical grounding element 140 is not in contact with the aircraft 500, and thus, the aircraft 500 is not grounded. Once the electrical grounding element 140 is sufficiently engaged against the exterior surface 510 of the aircraft 500, the resulting relative movement/offset between the first segment 116 and the second segment 118 of the pivot arm 110 will trip the limit switch 160. When the limit switch 160 is tripped, the "lightning grounding element on" indicator light 632 is illuminated to indicate to the operator that the electrical grounding element is physically contacting the aircraft 500, and thus the aircraft 500 is therefore grounded. Passengers can then be permitted to board or de-plane the aircraft 500. The grounded apparatus 100 facilitates contact with the aircraft using a swinging movement as opposed to a linear extension movement, making damage to the aircraft less likely, particularly if the aircraft were to move pass the pivot arm 110 and make incidental contact.

If the electrical grounding element 140 fails to make sufficient contact with the aircraft 500 when the pivot arm 110 is extended or loses contact with the aircraft 500, the "lightning grounding element off" indicator light 630 will illuminate to alert the operator that the aircraft is not grounded. Physical contact with the aircraft may be lost due to unintentional movement between the passenger loading bridge 250 and the aircraft 500. In one example, the "lightning grounding element off" indicator light 630 may be activated a predetermined period of time after the extend button 620 has been selected, when there is a failure to make physical contact between the electrical grounding element 140 and the aircraft 500. Furthermore, if some other failure is detected in the system 600, such as the actuator motor 172 fails to extend or retract the pivot arm, the fault indicator light 640 may be illuminated and/or an alert is generated via the loudspeaker or horn 650.

After passenger boarding or de-planing is complete, the operator may select the switch 622. This causes the actuator control circuit 610 to provide a control signal to the actuator motor 172 to retract the pivot arm 110 of the lightning grounding apparatus 100 away from the aircraft 500. The operator may then retract the passenger loading bridge 250 from the aircraft 500, resuming a position such as that shown in FIG. 7.

Figure 11:
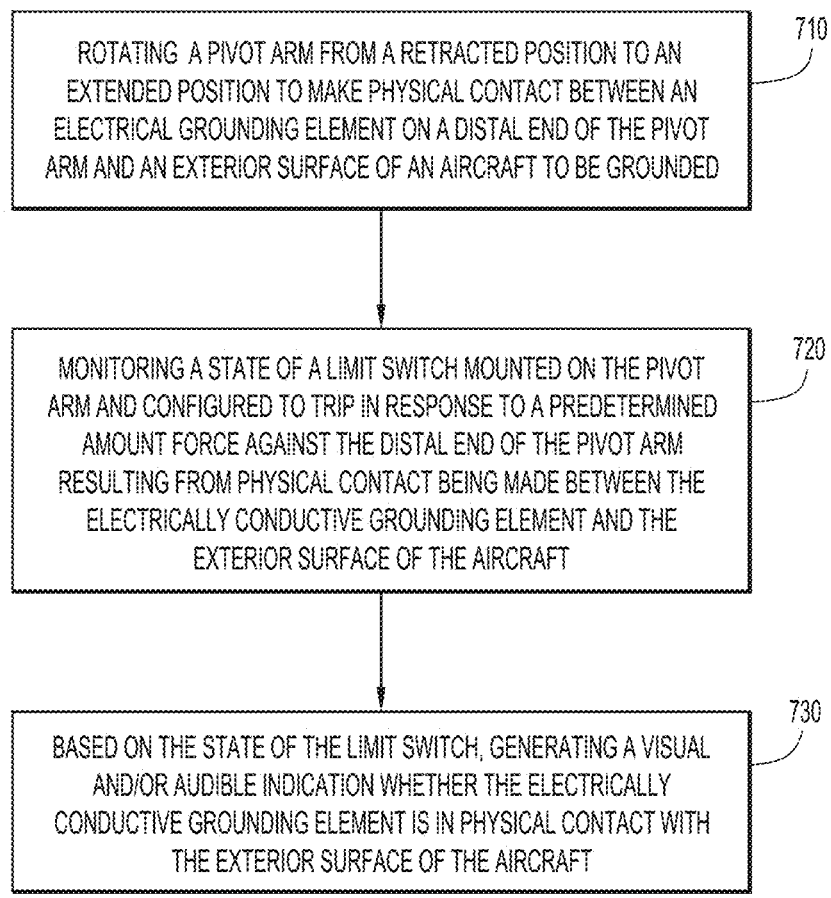
FIG. 11 is a flow chart depicting a method for grounding an aircraft i, according to an example embodiment.

Reference is now made to FIG. 11. FIG. 11 illustrates a flow chart depicting a method 700 for grounding an aircraft, according to an example embodiment. At 710, a pivot arm is rotated from a retracted position to an extended position to make physical contact between an electrical grounding element on a distal end of the pivot arm and an exterior surface of an aircraft to be grounded. Operation 710 may be initiated by an operator, through an operator control console, activating an actuator that is mechanically coupled to the pivot arm to move the pivot arm between the retracted position and the extended position. At 720, a state is monitored of a limit switch that mounted on the pivot arm and configured to trip in response to a predetermined amount force against the distal end of the pivot arm resulting from physical contact being made between the electrical grounding element and the exterior surface of the aircraft. At 730, based on the state of the limit switch, a visual and/or audible indication is generated to indicate whether the electrical grounding element is in physical contact with the exterior surface of the aircraft.

In one form, an apparatus is provided comprising: a pivot arm having a proximal end and a distal end; an electrical grounding element at the distal end of the pivot arm; an actuator mechanically coupled to the pivot arm and configured to rotate the pivot arm about an axis so as to swing the distal end of the pivot arm between a retracted position and an extended position to make physical contact between the electrical grounding element and a surface of a structure to be grounded; a limit switch; and a limit switch operating arm configured to trip the limit switch in response to a predetermined amount of force against the distal end of the pivot arm resulting from physical contact being made between the electrical grounding element and the surface of the structure.

In another form, a system is provided comprising: a lightning grounding apparatus including: a pivot arm having a proximal end and a distal end; an electrical grounding element at the distal end of the pivot arm; at least one grounding strap electrically connected to the electrical grounding element; an actuator mechanically coupled to the pivot arm and configured to rotate the pivot arm about an axis so as to swing the distal end of the pivot arm between a retracted position and an extended position to make physical contact between the electrical grounding element and an exterior surface of an aircraft; a limit switch; a limit switch operating arm configured to trip the limit switch in response to a predetermined amount of force against the distal end of the pivot arm resulting from physical contact being made between the electrical grounding element and the exterior surface of the aircraft; and a control interface unit configured to control the actuator and connected to the limit switch; an operator control panel for a passenger loading bridge, the operator control panel being electrically connected to the control interface unit, the operator control panel including: at least one control button to initiate operation of the actuator in order to move the pivot arm between the retracted position and the extended position; and at least one indicator that is activated, based on a state of the limit switch, configured to visually or audibly indicate whether the electrical grounding element is in physical contact with the exterior surface of the aircraft.

In still another form, a method is provided comprising: rotating a pivot arm from a retracted position to an extended position to make physical contact between an electrical grounding element on a distal end of the pivot arm and an exterior surface of an aircraft to be grounded; monitoring a state of a limit switch mounted on the pivot arm and configured to trip in response to a predetermined amount force against the distal end of the pivot arm resulting from physical contact being made between the electrical grounding element and the exterior surface of the aircraft; and based on the state of the limit switch, generating a visual and/or audible indication whether the electrical grounding element is in physical contact with the exterior surface of the aircraft.

The operation of generating the visual and/or audible indication is performed on an operator control console of a passenger loading bridge. The operation of activating includes selecting a control button or switch on the operator control console of the passenger loading bridge.

The pivot arm may include a first segment and a second segment, the first segment extending between the proximal end and an intermediate point of the pivot arm, the second segment extending between the intermediate point and the distal end, the first segment and the second segment attached to each other at the intermediate point in a hinge configuration such that the first segment and the second segment can pivot relative to each other.

The limit switch operating arm may include a first end and a second end, the first end connected to the first segment of the pivot arm, and the second end of the limit switch operating arm configured to abut the second segment of the pivot arm, wherein the predetermined amount of force causes the limit switch operating arm to rotate by an amount sufficient to trip the limit switch.

The actuator may be a linear actuator having an actuator rod that is mechanically coupled to the proximal end of the pivot arm and is configured to move between a first actuator position placing the pivot arm in the retracted position and a second actuator position placing the pivot arm in the extended position.

The apparatus may further include: a support frame to which the linear actuator is configured to attached; first and second support arms extending above the support frame and spaced apart from each other; a bracket configured to attach to the first segment of the pivot arm, the bracket including first and second bracket arms extending on opposite sides of the first and second support arms, and a pivot connector mounted between the first and second support arms to rotate about a pin passing through the first and second support arms; and an actuator pivot attached to the pivot connector and to an actuator rod of the linear actuator, wherein the actuator pivot is configured to translate linear movement of the actuator rod between the first actuator position and the second actuator position to rotational movement of the pivot arm between the retracted position and the extended position.

The apparatus may further include an actuator limit switch and an actuator limit switch operating arm coupled to the actuator pivot, wherein the actuator limit switch is configured to monitor movement of the actuator pivot.

The apparatus may further include a mounting bracket to which the support frame is configured to attach, wherein the mounting bracket is configured to attach to an exterior wall of a passenger loading bridge so as to place the pivot arm in a position proximate an aircraft to be grounded when the passenger loading bridge is at a boarding door of an aircraft. The grounding strap may electrically connect between the electrical grounding element and the mounting bracket.

The apparatus may further including a control interface unit configured to control the actuator and connected to the limit switch. An electrical connection may be provided between the control interface unit and an operator control panel in the passenger loading bridge.

In this description, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions and/or other characteristics (e.g., time, pressure, temperature, distance, etc.) of an element, operations, conditions, etc. the phrase 'between X and Y' represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
    a pivot arm having a proximal end and a distal end, wherein the pivot arm includes a first segment and a second segment, the first segment extending between the proximal end and an intermediate point of the pivot arm, the second segment extending between the intermediate point and the distal end, the first segment and the second segment attached to each other at the intermediate point in a hinge configuration such that the first segment and the second segment can pivot relative to each other;
    an electrical grounding element at the distal end of the pivot arm;
    an actuator mechanically coupled to the pivot arm and configured to rotate the pivot arm about an axis so as to swing the distal end of the pivot arm between a retracted position and an extended position to make physical contact between the electrical grounding element and a surface of a structure to be grounded;
    a limit switch; and
    a limit switch operating arm configured to trip the limit switch in response to a predetermined amount of force against the distal end of the pivot arm resulting from physical contact being made between the electrical grounding element and the surface of the structure.

2. The apparatus of claim 1, wherein the limit switch operating arm includes a first end and a second end, the first end connected to the first segment of the pivot arm, and the second end of the limit switch operating arm configured to abut the second segment of the pivot arm, wherein the predetermined amount of force causes the limit switch operating arm to rotate by an amount sufficient to trip the limit switch.

3. The apparatus of claim 2, wherein the actuator is a linear actuator having an actuator rod that is mechanically coupled to the proximal end of the pivot arm and is configured to move between a first actuator position placing the pivot arm in the retracted position and a second actuator position placing the pivot arm in the extended position.

4. The apparatus of claim 3, further including:
    a support frame to which the linear actuator is configured to attached;
    first and second support arms extending above the support frame and spaced apart from each other;
    a bracket configured to attach to the first segment of the pivot arm, the bracket including first and second bracket arms extending on opposite sides of the first and second support arms, and a pivot connector mounted between the first and second support arms to rotate about a pin passing through the first and second support arms; and
    an actuator pivot attached to the pivot connector and to an actuator rod of the linear actuator, wherein the actuator pivot is configured to translate linear movement of the actuator rod between the first actuator position and the second actuator position to rotational movement of the pivot arm between the retracted position and the extended position.

5. The apparatus of claim 4, further including an actuator limit switch and an actuator limit switch operating arm coupled to the actuator pivot, wherein the actuator limit switch is configured to monitor movement of the actuator pivot.

6. The apparatus of claim 4, further including a mounting bracket to which the support frame is configured to attach, wherein the mounting bracket is configured to attach to an exterior wall of a passenger loading bridge so as to place the pivot arm in a position proximate an aircraft to be grounded when the passenger loading bridge is at a boarding door of an aircraft.

7. The apparatus of claim 6, further comprising at least one grounding strap electrically connected between the electrical grounding element and the mounting bracket.

8. The apparatus of claim 6, further comprising a control interface unit configured to control the actuator and connected to the limit switch.

9. The apparatus of claim 8, further comprising an electrical connection between the control interface unit and an operator control panel in the passenger loading bridge.

10. A system comprising:
a lightning grounding apparatus including:
a pivot arm having a proximal end and a distal end;
an electrical grounding element at the distal end of the pivot arm;
at least one grounding strap electrically connected to the electrical grounding element;
an actuator mechanically coupled to the pivot arm and configured to rotate the pivot arm about an axis so as to swing the distal end of the pivot arm between a retracted position and an extended position to make physical contact between the electrical grounding element and an exterior surface of an aircraft;
a limit switch;
a limit switch operating arm configured to trip the limit switch in response to a predetermined amount of force against the distal end of the pivot arm resulting from physical contact being made between the electrical grounding element and the exterior surface of the aircraft; and
a control interface unit configured to control the actuator and connected to the limit switch;
an operator control panel for a passenger loading bridge, the operator control panel being electrically connected to the control interface unit, the operator control panel including:
at least one control button to initiate operation of the actuator in order to move the pivot arm between the retracted position and the extended position; and
at least one indicator that is activated, based on a state of the limit switch, configured to visually or audibly indicate whether the electrical grounding element is in physical contact with the exterior surface of the aircraft.

11. The system of claim 10, wherein the pivot arm includes a first segment and a second segment, the first segment extending between the proximal end and an intermediate point of the pivot arm, the second segment extending between the intermediate point and the distal end, the first segment and the second segment attached to each other at the intermediate point in a hinge configuration such that the first segment and the second segment can pivot relative to each other.

12. The system of claim 11, wherein the limit switch operating arm includes a first end and a second end, the first end connected to the first segment of the pivot arm, and the second end of the limit switch operating arm configured to abut the second segment of the pivot arm, wherein the predetermined amount of force causes the limit switch operating arm to rotate by an amount sufficient to trip the limit switch.

13. The system of claim 12, wherein the actuator is a linear actuator having an actuator rod that is mechanically coupled to the proximal end of the pivot arm and is configured to move between a first actuator position placing the pivot arm in the retracted position and a second actuator position placing the pivot arm in the extended position.

14. The system of claim 13, further comprising:
a support frame to which the linear actuator is configured to attached;
first and second support arms extending above the support frame and spaced apart from each other;
a bracket configured to attach to the first segment of the pivot arm, the bracket including first and second bracket arms extending on opposite sides of the first and second support arms, and a pivot connector mounted between the first and second support arms to rotate about a pin passing through the first and second support arms; and
an actuator pivot attached to the pivot connector and to an actuator rod of the linear actuator, wherein the actuator pivot is configured to translate linear movement of the actuator rod between the first actuator position and the second actuator position to rotational movement of the pivot arm between the retracted position and the extended position.

15. The system of claim 14, further comprising a mounting bracket to which the support frame is configured to attach, wherein the mounting bracket is configured to attach to an exterior wall of the passenger loading bridge so as to place the pivot arm in a position proximate the aircraft when the passenger loading bridge is at a boarding door of an aircraft.

16. The system of claim 14, further comprising an actuator limit switch and an actuator limit switch operating arm coupled to the actuator pivot, wherein the actuator limit switch is configured to monitor movement of the actuator pivot.

17. A method comprising:
rotating a pivot arm from a retracted position to an extended position to make physical contact between an electrical grounding element on a distal end of the pivot arm and an exterior surface of an aircraft to be grounded;
monitoring a state of a limit switch mounted on the pivot arm and configured to trip in response to a predetermined amount force against the distal end of the pivot arm resulting from physical contact being made between the electrical grounding element and the exterior surface of the aircraft; and
based on the state of the limit switch, generating a visual and/or audible indication whether the electrical grounding element is in physical contact with the exterior surface of the aircraft.

18. The method of claim 17, wherein generating includes generating the visual and/or audible indication on an operator control console of a passenger loading bridge.

19. The method of claim 18, wherein rotating the pivot arm to the extended position is in response to selection of a control button or switch on the operator control console of the passenger loading bridge.

20. The method of claim 18, wherein generating includes generating a first visual indication when the electrical grounding element is in physical contact with the exterior surface of the aircraft, and generating a second visual indication when the electrical grounding element is not in physical contact with the exterior surface of the aircraft signifying that the passenger loading bridge is not grounded.

* * * * *